ID card for United States Patent

United States Patent [19]
Light et al.

[11] 3,957,706
[45] May 18, 1976

[54] MOLDING COMPOSITION

[75] Inventors: Ronald R. Light; Theodore F. Gray, Jr.; Frederick B. Joyner, all of Kingsport, Tenn.

[73] Assignee: Eastman Kodak Company, Rochester, N.Y.

[22] Filed: Jan. 27, 1975

[21] Appl. No.: 544,447

Related U.S. Application Data

[63] Continuation-in-part of Ser. No. 439,161, Feb. 4, 1974, abandoned, and a continuation-in-part of Ser. No. 439,162, Feb. 4, 1974, abandoned.

[52] U.S. Cl. .............................. 260/22 R; 260/75 T; 260/76
[51] Int. Cl.² ................. C08L 91/00; C08G 63/66; C08G 63/70
[58] Field of Search ................. 260/75 R, 75 T, 76, 260/22 R, 860

[56] References Cited
UNITED STATES PATENTS

| | | | |
|---|---|---|---|
| 3,516,957 | 6/1970 | Gray et al. | 260/75 T |
| 3,575,931 | 4/1971 | Sherman | 260/75 R |
| 3,651,014 | 3/1972 | Witsiepe | 260/75 R |
| 3,763,109 | 10/1973 | Witsiepe | 260/75 R |
| 3,766,146 | 10/1973 | Witsiepe | 260/75 R |
| 3,784,520 | 1/1974 | Hoeschele | 260/75 R |

FOREIGN PATENTS OR APPLICATIONS

| | | |
|---|---|---|
| 1,945,101 | 3/1971 | Germany |

*Primary Examiner*—John C. Bleutge
*Assistant Examiner*—W. C. Danison, Jr.
*Attorney, Agent, or Firm*—Charles R. Martin; Daniel B. Reece, III

[57] ABSTRACT

A composition comprised of an admixture of a sodium salt of a monocarboxylic acid and known polyetheresters can be molded into articles having a combination of unobvious compression recovery after deformation and unobvious clearness.

10 Claims, No Drawings

MOLDING COMPOSITION

This application is a continuation-in-part of our copending application Ser. No. 439,161, filed Feb. 4, 1974, now abandoned, entitled "Molding Composition" and our co-pending application Ser. No. 439,162, filed Feb. 4, 1974, now abandoned, entitled "Molding Composition."

This invention relates to a polyetherester molding composition that can be molded into articles having a combination of unobvious compression recovery after deformation and unobvious clearness.

The use of objects molded from synthetic polymers has expanded rapidly in the last several decades. In particular, polyesters have gained wide acceptance for molding objects that will be subjected to high strength service. Some of these polyesters even have mechanical properties sufficiently high that objects molded from these polyesters can be substituted for objects formed from much stronger materials, such as ceramic and metallic materials.

Although most molded articles are required to exhibit high strength, some molded articles are required to exhibit the combination of a fairly high strength and an elastomeric character. The automobile industry, in particular, has a need for molded articles which possess the combination of fairly high strength and an elastomeric character. One group of molding plastics that exhibits the combination of fairly high strength and an elastomeric character is the polyetheresters formed by using a poly(alkylene oxide) glycol as a part of the diol. These polyetheresters are well known in the art and are described in U.S. Pat. No. 3,023,192, U.S. Pat. No. 3,013,914, and U.S. Pat. No. 3,763,109.

Although articles molded from these known polyetheresters exhibit the combination of fairly high strength and an elastomeric character, there are still several problems hampering commercial use of these polyetheresters for molding certain kinds of articles, such as exterior automobile components.

One problem hampering commerical use of many known polyetheresters is the low compression recovery after deformation. It is desirable that certain types of molded articles, such as automobile bumpers and fenders, be designed so as to recover from deformation that is likely to be encountered during normal service. Although 100 percent recovery is not obtainable, some degree of recovery after deformation is highly desirable.

Another problem hindering the use of polyetheresters for many applications is the absence of suitable transparency. One such application is in packaging where the contents must be visible. Another application is in pigmented molded parts where it is less difficult to pigment a more transparent plastic than a less transparent plastic.

Accordingly, an object of this invention is to provide compositions which can be molded into articles having an unobvious compression recovery after deformation.

Another object of this invention is to provide compositions which can be molded into articles having an unobvious clearness.

Broadly, this invention can be described as a molding composition comprised of an admixture of a sodium salt of a monocarboxylic acid and known polyetheresters.

Unobviously we have discovered that the addition of certain sodium salts of monocarboxylic acids to certain known polyetheresters provides a composition which can be molded to give articles exhibiting a combination of unobvious compression recovery after deformation and unobvious clearness. Articles molded from admixtures of the same known polyetheresters and other similar materials do not exhibit the combination of unobvious compression recovery after deformation and unobvious clearness.

The most pertinent art applicants are aware of is U.S. Pat. No. 3,575,931 and U.S. Pat. No. 3,516,957. Other prior art that applicants are aware of include U.S. Pat. No. 3,624,041, U.S. Pat. No. 3,651,041, U.S. Pat. No. 3,701,755, U.S. Pat. No. 3,761,450, U.S. Pat. No. 3,763,109, U.S. Pat. No. 3,663,487, U.S. Pat. No. 3,663,484, U.S. Pat. No. 3,483,169.

More specifically, the composition of this invention can be described as a composition comprising an admixture of A. from 0.5 to 5 weight percent, based on the total weight of the composition, of a sodium salt of a linear or branched saturated or unsaturated aliphatic monocarboxylic acid having 3 to 22 carbon atoms, and B. from 99.5 to 95 weight percent, based on the total weight of the composition, of a polyetherester having an inherent viscosity of at least 0.4, comprised of
   1. a dicarboxylic acid component comprised of
      a. 100–60 mole percent terephthalic acid, and
      b. 0–40 mole percent of an aliphatic or aromatic dicarboxylic acid having a molecular weight of less than 300, and
   2. a diol component comprised of
      a. a glycol comprised of 100–60 mole percent tetramethylene glycol and 0–40 mole percent of an aliphatic or aromatic glycol having a molecular weight of less than 300, and
      b. 10–60 weight percent, based on the weight of the polyetherester, of a poly(alkylene oxide) glycol having 2, 3, or 4 carbon atoms in the repeating unit and having a molecular weight in the range of 400 to 5,000, wherein the sum of the total mole percent amount of aliphatic or aromatic dicarboxylic acid having a molecular weight of less than 300 in part (B)(1)(b), the mole percent amount of aliphatic or aromatic glycol having a molecular weight of less than 300 in part (B)(2)(a) and the weight percent, based on the weight of the polyetherester, of the poly(alkylene oxide) glycol in part (B)(2)(b) equals at least 35 but does not exceed 80.

In one specific embodiment, the composition of this invention can be described as a composition comprising an admixture of A. from 0.5–2 weight percent, based on the total weight of the composition, of a sodium salt of a linear or branched saturated aliphatic monocarboxylic acid having 8 to 18 carbon atoms, and B. from 99.5–98 weight percent, based on the total weight of the composition, of a polyetherester having an inherent viscosity of at least 0.6 comprised of
   1. a dicarboxylic acid component comprised of
      a. 85–60 mole percent terephthalic acid, and
      b. 15–40 mole percent of aliphatic dicarboxylic acid containing 4–10 carbon atoms,
   2. a diol component comprised
      a. 100 mole percent of a glycol comprised of tetramethylene glycol, and b. 20–50 weight percent, based on the weight of the polyetherester, of poly(tetramethylene oxide) glycol having a molecular weight in the range of 800–4,000.

As broadly described above, sodium salts of linear or branched, saturated or unsaturated aliphatic monocarboxylic acids having 3 to 22 carbon atoms are useful in this invention.

Examples of sodium salts of saturated linear aliphatic monocarboxylic acids useful in this invention include sodium propionate, sodium pentanoate, sodium heptanoate, sodium decanoate. Other sodium salts of saturated aliphatic monocarboxylic acids useful in this invention are listed below.

| Number of Carbon Atoms | |
|---|---|
| 10 | Sodium Decanoate or Caprate |
| 11 | Sodium Undecanoate |
| 12 | Sodium Dodecanoate or Laurate |
| 13 | Sodium Tridecanoate |
| 14 | Sodium Tetradecanoate or Myristate |
| 15 | Sodium Pentadecanoate |
| 16 | Sodium Hexadecanoate or Palmitate |
| 17 | Sodium Heptadecanoate or Margarate |
| 18 | Sodium Octadecanoate or Stearate |
| 19 | Sodium Nonadecanoate |
| 20 | Sodium Eicosanoate or Arachidate |

Sodium stearate, sodium palmitate, and sodium laurate are preferred.

Examples of sodium salts of unsaturated linear aliphatic monocarboxylic acids useful in this invention include sodium oleate and sodium linoleate.

Examples of sodium salts of saturated branched aliphatic monocarboxylic acids useful in this invention include sodium 2-ethylhexanoate, sodium pivalate, sodium isobutyrate and sodium isovalerate.

Examples of sodium salts of unsaturated branched aliphatic monocarboxylic acids useful in this invention include sodium 3,7-dimethyl-2,6-octadienoate, sodium 5-ethyl-8-decenoate and sodium 17-methyl-cis-9-octadecenoate.

As broadly described above, the dicarboxylic acid that is used in conjunction with terephthalic acid can be an aliphatic or aromatic dicarboxylic acid having a molecular weight of less than 300. In one preferred embodiment this dicarboxylic acid can be a linear aliphatic dicarboxylic acid containing 4–10 carbon atoms.

Aliphatic dicarboxylic acids, as the term is used herein, refers to carboxylic acids havng two carboxyl groups each attached to a saturated carbon atom. If the carbon atom to which the carboxyl group is attached is saturated and is in a ring, the acid is cycloaliphatic and is included within the term "aliphatic dicarboxylic acid". Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in an isolated or fused benzene ring. It is not necessary that both functional carboxyl groups be attached to the same aromatic ring and where more than one ring is present, they can be joined by aliphatic or aromatic divalent radicals containing other substituents such as —O— or —$SO_2$—.

Representative aliphatic dicarboxylic acids which can be used in this invention are sebacic acid, 1,3-cyclohexane dicarboxylic acid, 1,4-cyclohexane dicarboxylic acid, adipic acid, pimelic acid, suberic acid, sebacic acid, glutaric acid, succinic acid, carbonic acid, oxalic acid, azelaic acid, diethyl-malonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis-(cyclohexane carboxylic acid), 3,4-furan dicarboxylic acid, and 1,1-cyclobutane dicarboxylic acid. Preferred aliphatic acids are 1,4cyclohexane dicarboxylic acid, adipic acid, pimelic acid, suberic acid, azelaic acid, or sebacic acid.

Representative aromatic dicarboxylic acids which can be used include phthalic and isophthalic acids, dibenzoic acid, substituted dicarboxy compounds with two benzene nuclei such as bis(p-carboxyphenyl)methane, 4,4'-oxydibenzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$-$C_{12}$ alkyl and ring substitution derivatives thereof, such as halo, alkoxy, and aryl derivatives. Hydroxyl acids such as p($\beta$-hydroxyethoxy) benzoic acid can also be used provided an aromatic dicarboxylic acid is also present. Aromatic carboxylic acids with 8–16 carbon atoms are preferred, particularly the phenylene dicarboxylic acids, i.e., phthalic and isophthalic acids.

The term "dicarboxylic acids", as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

While broadly the glycol that can be used to replace the tetramethylene glycol can be an aliphatic or aromatic glycol having a molecular weight of less than 300, in a preferred embodiment, the glycol can be an aliphatic or aromatic glycol having up to 12 carbon atoms. Examples of suitable glycols are ethylene, propylene, tetramethylene, pentamethylene, 2,2dimethyltrimethylene, hexamethylene, and decamethylene glycols, dihydroxy cyclohexane, cyclohexane dimethanol, resorcinol, hydroquinone, 1,5-dihydroxy naphthalene, etc. Other suitable diols are aliphatic diols containing 2–8 carbon atoms. Included among the bisphenols which can be used are bis(p-hydroxy) diphenyl, bis(p-hydroxphenyl) methane, and bis(p-hydroxyphenyl) propane. Equivalent ester-forming derivatives of diols are also useful. The term "aliphatic or aromatic glycol" as used herein includes equivalent ester-forming derivatives; however, the molecular weight requirement pertains to the diol only and not to its derivatives.

As broadly described above, the poly(alkylene oxide) glycol useful in this invention can be described as a poly(alkyleneoxide glycol) having 2, 3, or 4 carbon atoms in the repeating unit and having a molecular weight in the range of 400–5,000. In a preferred embodiment the poly(alkylene oxide) glycol can be described as a poly(tetramethylene oxide) glycol having a molecular weight in the range of 800–4,000 wherein the amount is 20–50 weight percent, based on the weight of the polyetherester. Examples of poly(alkylene oxide) glycols that can be used include poly(ethylene oxide) glycol, poly(propylene oxide) glycol and poly(tetramethylene oxide) glycol. These glycols are well known in the art and are disclosed in Defensive Publication T878,004 of Sept. 8, 1970, entitled "Poly(-Tetramethylene Glycol) Having A Narrow Molecular Weight Distribution And Its Manufacture", by Seaton et al.

It is essential that at least 60 mole percent of the dicarboxylic acid component be terephthalic acid and at least 60 mole percent of the diol component be tetramethylene glycol, sometimes called 1,4-butanediol. A further requirement of this invention is that the sum of the dicarboxylic acid that is not terephthalic acid, the glycol that is not tetramethylene glycol and the poly(alkylene oxide) glycol be within a certain range. Specifically, the sum of the total mole percent amount of aliphatic or aromatic dicarboxylic acid having a molecular weight of less than 300, the mole percent amount of aliphatic or aromatic glycol having a molecular weight of less than 300 and the weight percent, based on the weight of the polyetherester, of the poly(alkylene oxide) glycol must equal at least 35 but cannot exceed 80. For example, if 15 mole percent of the glycol is other than tetramethylene glycol and 10 mole percent of the dicarboxylic acid used is other than terephthalic acid, then the weight percent poly(alkylene oxide)glycol must be at least 10. Additionally, if 20 mole percent of the glycol is other than tetramethylene glycol and 40 mole percent of the dicarboxylic acid is other than terephthalic acid then the weight percent poly(alkylene oxide) glycol can be no greater than 20.

The polyetheresters described herein are well known in the art and can be prepared in accordance with the disclosure of U.S. Pat. No. 3,013,914 and U.S. Pat. No. 3,763,109.

In this invention the polyetherester has an inherent viscosity of at least 0.4 and preferably 0.6, or even higher. Inherent viscosities of between 1.0 and 2.0 are often preferred.

The physical form of the sodium salt useful in this invention can vary depending on the precise manner selected to form the admixture of sodium salt and polyetherester. In one embodiment, where the admixture is formed by blending powdered sodium stearate and powdered polyetherester, granular sodium stearate having particles within the range of 50–500 microns can be used.

The composition of the invention is formed by admixing the sodium salt into the polyetherester according to techniques well known in the art. According to a preferred method the polyetherester and sodium stearate are reduced to a powder, for example 200 microns, and the blended powders are extruded at a temperature of 200° to 250°C. to form the admixture. According to another method a conventional Banbury mixer can be used to form the admixture.

The composition of this invention can be used for molding useful articles, such as exterior automobile components.

The composition of this invention can be molded into useful articles by molding techniques well known in the art, such as injection molding.

Although the polyetheresters of this invention possess many desirable properties, it is advisable to stabilize certain of the compositions to heat or radiation by ultraviolet light. This can be done by incorporating stabilizers in the polyetherester compositions. Satisfactory stabilizers are disclosed in U.S. Pat. No. 3,763,109.

The properties of the composition of the invention can be modified by incorporation of various conventional additives such as pigments, inorganic fillers such as carbon black, silica gel, alumina, clays, chopped fiber glass, and flame retardants.

The compositions of this invention have an outstanding balance of properties. Articles molded from many of the compositions of the invention exhibit low warpage, excellent surface finish, good paintability with typical paint systems, absence of surface sink marks, increased transparency, increased recovery in compression, and increased impact strength. This exceptional balance of properties makes the composition of the invention particularly suitable for molding into articles used on automobile exteriors and similar applications.

In this patent application the term "unobvious compression recovery after deformation" and words of similar import, means that the recovery after compression deformation of articles molded from the sodium salt containing composition of this invention is unobviously higher than the recovery after compression deformation of articles similarly molded from only the polyetherester portion of the composition of the invention. In one embodiment the compression recovery in accordance with ASTM D395 Method B after 25 percent compression at 70°C. is increased at least 10 percent over the compression recovery of articles similarly molded from only the polyetherester portion of the composition of the invention. In another embodiment the compression recovery is increased at least 25 percent over the compression recovery of articles similarly molded from only the polyetherester portion of the composition of the invention.

In this patent application the term "unobvious clearness", and words of similar import, means that injection molded, ⅛inch D638 Type I ASTM tensile ars exhibit a percent light transmission of at least 10 as measured by a Welch Densichron, Model 1, Catalogue Number 3853D, manufactured by Welch Scientific Company.

As is known to those skilled in the art, the Welch Densichron is a high sensitivity photoelectric photometer having a light source below a measuring aperture of approximately ⅛ inch in diameter on which one places the sample whose optical density is to be measured. A probe is then attached to an arm above this surface and, after calibration is accomplished, the optical density is determined and converted to percent transmission by using the conversion table in the Welch Densichron Model 1 Photometer operation manual.

In the following examples, the inherent viscosity of the polymer is measured at about 25°C. using 0.5 percent of the polymer in a solvent composed of 60 percent by weight of phenol and 40 percent by weight of tetrachloroethane.

EXAMPLE 1

This example illustrates the unobvious compression recovery after deformation and unobvious clearness of articles molded from the composition of the invention.

A polyetherester is prepared from 70 mole percent terephthalate, 30 mole percent 1,4-cyclohexanedicarboxylate (34% trans and 66% cis), tetramethylene glycol and 24.7 weight percent, based on the weight of the polyetherester, poly(tetramethylene oxide) glycol. In this preparation 35 grams (0.035 mole) of a 1000 molecular weight poly(tetramethylene oxide) glycol, 65.4 g. (0.3371 mole) of dimethyl terephthalate, 28.9 g. (0.1445 mole) of 34% trans and 66% cis dimethyl-1,4-cyclohexanedicarboxy-late and 98.4 g. (1.093 mole) tetramethylene glycol are combined in the presence of 100 ppm. titanium from titanium tetraisopropoxide. The amount of tetramethylene glycol includes 100% excess over that needed to form the polymer. Dilauryl-3,3'-thiodipropionate (0.70 g.) (0.5%) and 2,6-didodecyl-p-cresol (0.35 g.) (0.25%) are added as stabilizers. This mixture is stirred for about 2 hours under nitrogen while heating in a 200°C. Woods metal bath. Methanol is distilled from the reaction during this time. To form the high molecular weight polymer the reaction is heated under a reduced pressure of 0.10 mm. of mercury for about 2.25 hours in a 251°C. Woods metal bath. A viscous polymer having an inherent viscosity of 1.35 is formed. The polymer is vented to nitrogen and cooled under nitrogen. After grinding to about ¼-inch particle size, 0.26 g. (0.25% based on polymer weight) of 2,6-didodecyl-p-cresol dissolved in 177 ml. of cyclohexane is poured on 104 g. of the polymer and the cyclohexane is allowed to evaporate leaving the 2,6-didodecyl-p-cresol stabilizer on the polymer.

A portion of the polymer is dried and injection molded into ASTM Type 1 tensile test bars on a 6 oz. New Britain reciprocating screw injection molding machine.

The remaining polymer is ground to particles having a size range of 50–600 microns. A portion of this powder is blended with 1.0 weight percent, based on the weight of the sodium stearate and polymer, of a commercially available sodium stearate having particles within the range of 50–500 microns. Another portion of this powder is blended with 1.0 weight percent, based on the weight of the sodium laurate and polymer, of a commercially available sodium laurate having particles within the range of 50–500 microns. Other portions of this powder are similarly blended with sodium propionate, sodium palmitate, sodium docosanoate and sodium 2-ethylhexanoate. The portions of polymer admixed with all these sodium salts are similarly molded into test bars.

Other portions of the powdered polymer are similarly admixed with 1.0 weight percent of several other similar additives beyond the scope of the invention and similarly molded into test bars.

Test bars of all of these compositions are then tested to determine the compression recovery after deformation by conducting compression set tests. Compression set is determined after 25 percent compression in accordance with ASTM D395, Method B at 70°C. The test bars are then tested for percent light transmission. Results of these tests are presented in Table 1.

TABLE 1

| Additive | Light Transmission, % | Compression Recovery, %[1] |
|---|---|---|
| None | 6.3 | 23 |
| Lithium Stearate | 2.3 | 27 |
| Lithium Palmitate | 2.4 | 26 |
| Sodium Acetate | 4.2 | 25 |
| Sodium Benzoate | 4.6 | 36 |
| Calcium Stearate | 5.0 | 25 |
| Zinc Stearate | 5.5 | 24 |
| Sodium Propionate | 13.8 | 32 |
| Sodium Palmitate | 17.4 | 29 |
| Sodium Laurate | 18.6 | 27 |
| Sodium Docosanoate | 19.0 | 30 |
| Sodium Stearate | 19.0 | 34 |
| Sodium 2-ethyl hexanoate | 20.4 | 25 |

[1]Compression recovery % = 100% − % compression set at 70°C.

As can be readily appreciated from considering the data presented in TABLE 1, only the composition of the invention containing sodium salts of linear or branched saturated or unsaturated aliphatic monocarboxylic acids having 3 to 22 carbon atoms exhibit a combination of an unobvious compression recovery after deformation and unobvious clearness. As will be appreciated by one skilled in the art, the compositions illustrating the invention contain sodium propionate, sodium laurate, sodium docosanoate, sodium stearate, and sodium 2-ethylhexanoate. The compositions of the same polyetherester and additives which are similar to the additives useful in this invention but are beyond the scope of this invention are lithium stearate, lithium palmitate, sodium acetate, sodium benzoate, calcium stearate and zinc stearate. These compositions fail to exhibit the combination of an unobvious compression recovery and unobvious clearness.

When other dicarboxylic acids within the scope of the invention are used in place of the 1,4-cyclohexanedicarboxylic acid substantially the same results are achieved. When other poly(alkylene oxide) glycols within the scope of the invention are used in place of the poly(tetramethylene oxide) glycol substantially the same results are achieved. Substantially the same results are achieved when a portion of the tetramethylene glycol is replaced by another glycol within the scope of the invention. When other sodium salts of linear aliphatic monocarboxylic acids within the scope of this invention are used in place of sodium stearate and sodium laurate substantially the same results are achieved.

The invention has been described in detail with particular reference to certain preferred embodiments thereof, but it will be understood that variations and modifications may be made within the spirit and scope of the invention as described herein.

We claim:
1. A composition comprising an admixture of
   A. from 0.5 to 5 weight percent, based on the total weight of the composition, of a sodium salt of a linear or branched saturated or unsaturated ali- phatic monocarboxylic acid having 3 to 22 carbon atoms, and

B. from 99.5 to 95 weight percent, based on the total weight of the composition, of a polyetherester having an inherent viscosity of at least 0.4 measured at about 25°C. using 0.5 percent of the polyetherester in a solvent composed of 60 percent by weight of phenol and 40 percent by weight of tetrachloroethane, comprised of the polymeric condensation product of
1. a dicarboxylic acid component comprised of
   a. 100–60 mole percent terephthalic acid, and
   b. 0–40 mole percent of an aliphatic or aromatic dicarboxylic acid having a molecular weight of less than 300, and
2. a diol component comprised of
   a. a glycol comprised of 100–60 mole percent tetramethylene glycol and 0–40 mole percent of an aliphatic or aromatic glycol having a molecular weight of less than 300, and
   b. 10–60 weight percent, based on the weight of the polyetherester, of a poly(alkylene oxide) glycol having 2, 3, or 4 carbon atoms in the repeating unit and having a molecular weight in the range of 400 to 5,000, wherein the sum of the total mole percent amount of aliphatic or aromatic dicarboxylic acid having a molecular weight of less than 300 in part (B)(1)(b), the mole percent amount of aliphatic or aromatic glycol having a molecular weight of less than 300 in part (B)(2)(a) and the weight percent, based on the weight of the polyetherester, of the poly(alkylene oxide) glycol in part (B)(2)(b) equals at least 35 but does not exceed 80.

2. The composition of claim 1 wherein the diol component in part (B)(2) is comprised of
A. 100–70 mole percent tetramethylene glycol and 0–30 mole percent of an aliphatic or aromatic glycol having up to 12 carbon atoms, and
B. 20–50 weight percent, based on the weight of the polyetherester, of poly(tetramethylene oxide) glycol having a molecular weight in the range of 800 to 4,000.

3. The composition of claim 1 wherein the sodium salt of the linear or branched aliphatic saturated or unsaturated monocarboxylic acid is from 0.5–2 weight percent, and the polyetherester is from 99.5–98 weight percent.

4. The composition of claim 1 wherein the poly(alkylene oxide) glycol of part (B)(2)(b) is poly(tetramethylene oxide) glycol.

5. The composition of claim 1 wherein the aliphatic or aromatic carboxylic acid having a molecular weight of less than 300 in part (B)(1)(b) is a linear aliphatic dicarboxylic acid containing 4–10 carbon atoms.

6. The composition of claim 5 wherein the linear aliphatic dicarboxylic acid is adipic acid, pimelic acid, suberic acid, azelaic acid, or sebacic acid.

7. The composition of claim 1 wherein the aliphatic or aromatic carboxylic acid having a molecular weight of less than 300 in part (B)(1)(b) is 1,4-cyclohexanedicarboxylic acid.

8. A composition comprising an admixture of
A. from 0.5–2 weight percent, based on the total weight of the composition, of a sodium salt of a linear or branched saturated aliphatic monocarboxylic acid having 3 to 18 carbon atoms, and
B. from 99.5–98 weight percent, based on the total weight of the composition, of a polyetherester having an inherent viscosity of at least 0.6 measured at about 25°C. using 0.5 percent of the polyetherester in a solvent composed of 60 percent by weight of phenol and 40 percent by weight of tetrachloroethane comprised of the polymeric condensation product of
1. a dicarboxylic acid component comprised of
   a. 85–60 mole percent terephthalic acid, and
   b. 15–40 mole percent of aliphatic dicarboxylic acid containing 4–10 carbon atoms.
2. a diol component comprised of
   a. 100 mole percent of a glycol comprised of tetramethylene glycol, and
   b. 20–50 weight percent, based on the weight of the polyetherester, of poly(tetramethylene oxide) glycol having a molecular weight in the range of 800–4,000.

9. The composition of claim 8 wherein the dicarboxylic acid component in part (B)(1)(b) is 1,4-cyclohexanedicarboxylic acid.

10. The composition of claim 8 wherein the sodium salt of the linear or branched aliphatic saturated monocarboxylic acid is sodium stearate, sodium palmitate, sodium myristate, sodium laurate, or sodium 2-ethylhexanoate.

* * * * *